(12) United States Patent
Nakamura et al.

(10) Patent No.: US 9,958,043 B2
(45) Date of Patent: May 1, 2018

(54) POWER TRANSMISSION DEVICE (71) Applicant: DENSO CORPORATION, Kariya, Aichi-pref. (JP)

(72) Inventors: Yousuke Nakamura, Ichinomiya (JP); Manabu Saiki, Chiryu (JP); Kiyomi Okuda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 214 days.

(21) Appl. No.: 14/781,873

(22) PCT Filed: Mar. 28, 2014

(86) PCT No.: PCT/JP2014/001842
§ 371 (c)(1),
(2) Date: Oct. 1, 2015

(87) PCT Pub. No.: WO2014/162710
PCT Pub. Date: Oct. 9, 2014

(65) Prior Publication Data
US 2016/0053876 A1   Feb. 25, 2016

(30) Foreign Application Priority Data
Apr. 5, 2013  (JP) ................. 2013-079424

(51) Int. Cl.
*F16H 35/10*  (2006.01)
*F16D 3/78*  (2006.01)
(Continued)

(52) U.S. Cl.
CPC ............... *F16H 35/10* (2013.01); *F16D 3/78* (2013.01); *F16D 9/06* (2013.01); *F16H 55/36* (2013.01); *F16D 1/076* (2013.01)

(58) Field of Classification Search
CPC ............ F16H 35/10; F16H 55/36; F16D 3/78
See application file for complete search history.

(56) References Cited

U.S. PATENT DOCUMENTS 4,860,867 A     8/1989  Nishimura
6,110,061 A *   8/2000  Kishibuchi ......... F04B 27/0895
                                                           464/30
(Continued)

FOREIGN PATENT DOCUMENTS

JP    2003307265 A    10/2003
JP    2006200570 A    8/2006
(Continued)

OTHER PUBLICATIONS

International Search Report and Written Opinion (in Japanese with English Translation) for PCT/JP2014/001842, dated Jun. 10, 2014; ISA/JP.

*Primary Examiner* — William E Dondero
*Assistant Examiner* — Mark K Buse
(74) *Attorney, Agent, or Firm* — Harness, Dickey & Pierce, P.L.C.

(57) ABSTRACT

A power transmission device includes a pulley constituting a driving-side rotor, an inner hub, a washer and a limiter which constitute a driven-side rotor, and a plate configured as a linking elastic member that connects the driving-side rotor and the driven-side rotor. A flat spring that elastically deforms in a direction along a rotation shaft is adopted as the plate. A distance in an axial direction between a pulley-side attachment portion of the plate which is attached to the pulley and a hub-side attachment portion of the plate which is attached to the inner hub is adjusted to fall within a predetermined standard range by interposing a shim as an adjustment member between the plate and the pulley.

8 Claims, 5 Drawing Sheets (51) Int. Cl.
  *F16H 55/36*   (2006.01)
  *F16D 9/06*    (2006.01)
  *F16D 1/076*   (2006.01)

(56) References Cited

U.S. PATENT DOCUMENTS

| | | | | |
|---|---|---|---|---|
| 6,120,257 | A * | 9/2000 | Saiki | F16D 43/215 192/12 R |
| 6,332,842 | B1 * | 12/2001 | Tabuchi | F16D 9/06 403/11 |
| 7,041,019 | B2 * | 5/2006 | Matsubara | F04B 27/0895 474/199 |
| 2003/0194263 | A1 * | 10/2003 | Ueda | F16D 7/024 403/2 |
| 2005/0239555 | A1 | 10/2005 | Ueda et al. | |
| 2006/0084541 | A1 * | 4/2006 | Nosaka | F16D 3/68 474/170 |
| 2006/0157314 | A1 * | 7/2006 | Yamamoto | F16D 7/06 192/84.941 |
| 2006/0178241 | A1 * | 8/2006 | Nosaka | F16H 55/36 474/166 |
| 2007/0270257 | A1 * | 11/2007 | Tada | F16D 3/68 474/70 |
| 2009/0258741 | A1 | 10/2009 | Nosaka et al. | |
| 2016/0252143 | A1 * | 9/2016 | Kato | F16D 43/215 192/46 |

FOREIGN PATENT DOCUMENTS

| | | |
|---|---|---|
| JP | 2006258109 A | 9/2006 |
| JP | 2008190695 A | 8/2008 |
| WO | WO-2008044590 A1 | 4/2008 |

* cited by examiner

POWER TRANSMISSION DEVICE

CROSS REFERENCE TO RELATED APPLICATIONS

This application is a U.S. National Phase Application under 35 U.S.C. 371 of International Application No. PCT/JP2014/001842 filed on Mar. 28, 2014 and published in Japanese as WO 2014/162710 A1 on Oct. 9, 2014. This application is based on and claims the benefit of priority from Japanese Patent Application No. 2013-079424 filed on Apr. 5, 2013. The entire disclosures of all of the above applications are incorporated herein by reference.

TECHNICAL FIELD

The present disclosure relates to a power transmission device that transmits a rotation driving power.

BACKGROUND ART

Conventionally, a power transmission device that transmits a rotation driving power, outputted from a driving source, to a driving target device is known. This kind of power transmission device is required to have a function to block transmission of a rotation driving power quickly in order to prevent the driving source from being subjected to an undue load when the driving target device is locked by burning or the like.

For example, in Patent Document 1, disclosed as a power transmission device, which transmits a rotation driving power outputted from a vehicle-travelling engine that is a driving source to a compressor of a vehicular refrigeration cycle that is a driving target device, is one that has a torque limiter to block transmission of the rotation driving power by being broken when a torque transmitted from the engine to the compressor exceeds a predetermined torque.

More specifically, the power transmission device of Patent Document 1 includes a pulley rotated by the rotation driving power outputted from the engine, an inner hub linked with a rotation shaft of the compressor, and a damper made of rubber that is an elastic material and is used as an linking elastic member linking the pulley with the inner hub, and the torque limiter is configured by providing a breakage portion in a part of the inner hub.

The breakage portion is broken, and a part of the inner hub is separated from the rotation shaft of the compressor when the torque transmitted from the engine to the compressor exceeds the predetermined torque. Accordingly, the rotation driving power outputted from the engine is prevented from being transmitted to the compressor.

The damper gives a load on the inner hub in a direction away from the rotation shaft of the compressor while the breakage portion is not broken. After the breakage portion is broken, the damper displaces a part of the inner hub separated from the rotation shaft of the compressor in the direction away from the rotation shaft of the compressor. Therefore, after the breakage portion is broken, noise generation caused by contact between the part of the inner hub separated from the rotation shaft of the compressor and the rotation shaft of the compressor is limited.

PRIOR ART DOCUMENT

Patent Document

Patent Document 1: Japanese Patent No. 2003-307265

SUMMARY OF THE INVENTION

By the way, considered as a method of reducing a manufacturing cost of this kind of power transmission device is adoption of a metallic flat spring shaped into a plate as a linking elastic member instead of the damper made of rubber.

However, generally, an elastically deformable range (elasticity range) of the flat spring made of metal is smaller than that of the damper made of rubber. Therefore, according to a study of the inventor of the present disclosure, when the flat spring is disposed so as to give an unnecessary load on the inner hub while the breakage portion is not broken, a durability life of the flat spring may be influenced negatively.

Accordingly, in order to attach the flat spring so as to provide an appropriate load on the inner hub in the direction away from the rotation shaft of the compressor, an attachment accuracy may be required to be higher than an attachment accuracy of the damper made of rubber. As a result, a sufficient reduction of manufacturing cost may not be obtained sometimes even if the flat spring is adopted instead of the damper.

In consideration of the above-described points, it is an objective of the present disclosure to improve an attachment workability of a linking elastic member in a power transmission device including the linking elastic member shaped into a plate.

According to an aspect of the present disclosure, a power transmission device transmits a rotation driving power outputted from a driving source to a driving target device. The power transmission device includes a driving-side rotor rotated by the rotation driving power, a driven-side rotor rotated together with a rotation shaft of the driving target device, and a linking elastic member that has a platy shape spreading in a direction perpendicular to the rotation shaft, elastically deforms in an axial direction of the rotation shaft and connects the driven-side rotor and the driving-side rotor. The driven-side rotor includes a breakage portion that is broken when a torque transmitted from the driving source to the rotation shaft of the driving target device becomes higher than or equal to a predetermined standard torque, and a separation part that is separated from the rotation shaft when the breakage portion is broken. The linking elastic member connects the separation part and the driving-side rotor, and the linking elastic member includes a driving-side attachment portion attached to the driving-side rotor and a driven-side attachment portion attached to the driven-side rotor. The power transmission device further includes an adjustment member that adjusts a distance between the driving-side attachment portion and the driven-side attachment portion in the axial direction of the rotation shaft such that the distance falls within a predetermined standard range.

Accordingly, since the power transmission device has the adjustment member, the distance in the axial direction between the driving-side attachment portion and the driven-side attachment portion can be adjusted to be within the predetermined standard range. Therefore, the load that is given on the driven-side rotor by an elastic deformation of the linking elastic member in the axial direction can be easily adjusted to be an appropriate value. Consequently, an attachment workability in attaching the linking elastic member can be improved.

EMBODIMENTS FOR EXPLOITATION OF THE INVENTION

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the present disclosure will be described referring to FIGS. 1 to 4. A power transmission device 20 according to the present embodiment is adopted for transmitting a rotation driving power outputted from a vehicle-traveling engine to a compressor 10 of a vehicular refrigeration cycle. Therefore, in the present embodiment, the engine is used as an example of a driving source that outputs rotation driving power. The compressor 10 is used as an example of a driving target device to which the rotation driving power outputted from the driving source is transmitted. The vehicular refrigeration cycle according to the present embodiment is applied to an air conditioning device for a vehicle and functions to cool an air blown to a vehicle interior.

Moreover, in this vehicular refrigeration cycle, a swash-plate type and variable capacity compressor is adopted as the compressor 10 compressing a refrigerant. In such variable capacity compressor, when a discharge capacity is reduced to approximately 0 percent, the compressor 10 can be made into an operation stop state where the compressor 10 virtually does not show refrigerant discharge capability. Therefore, in the present embodiment, a crutch-less device in which the engine and the compressor are connected at all times is adopted as the power transmission device 20.

Figure 1:
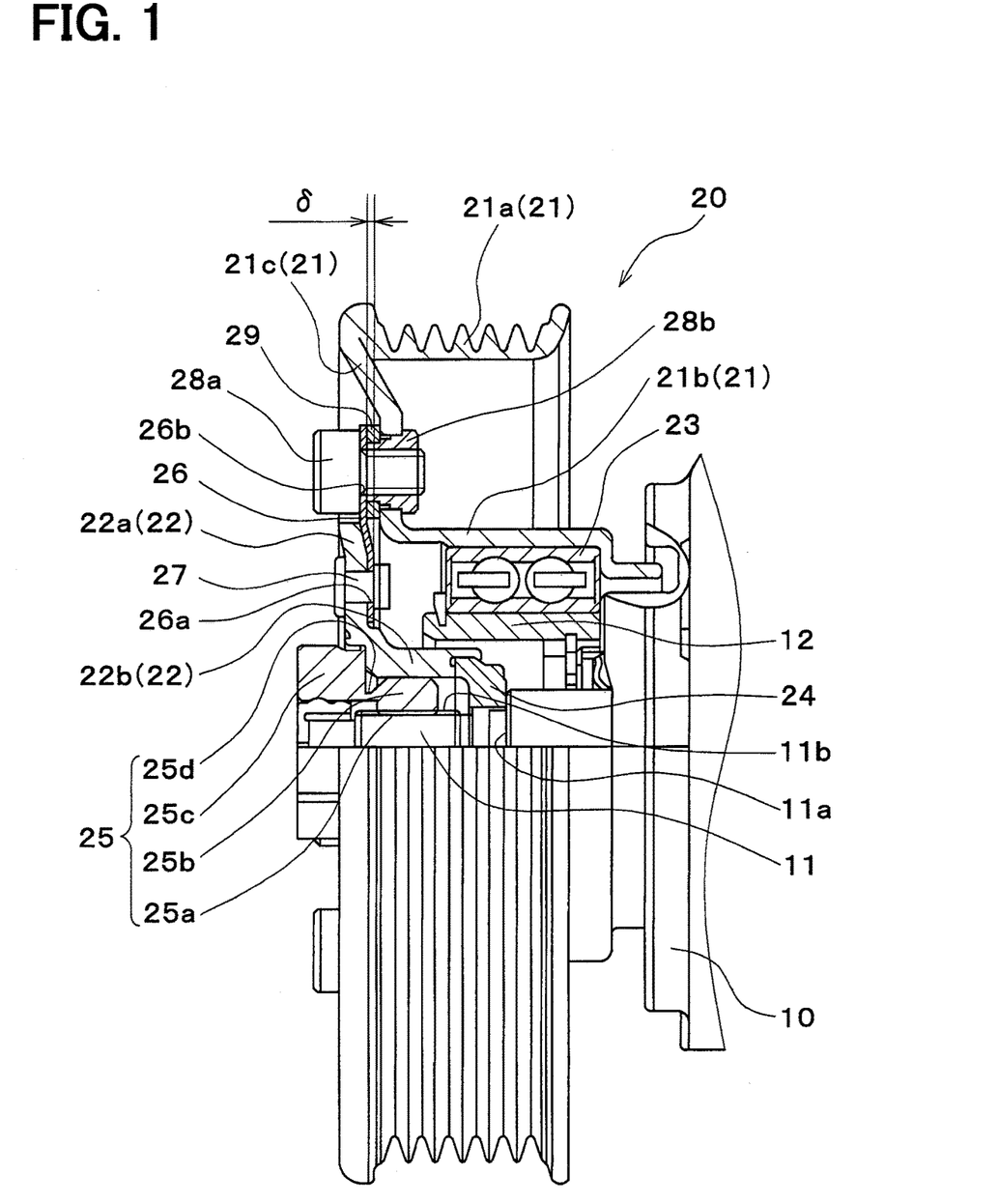
FIG. 1 is a partially sectional diagram illustrating a power transmission device according to a first embodiment of the present disclosure.
Figure 2:
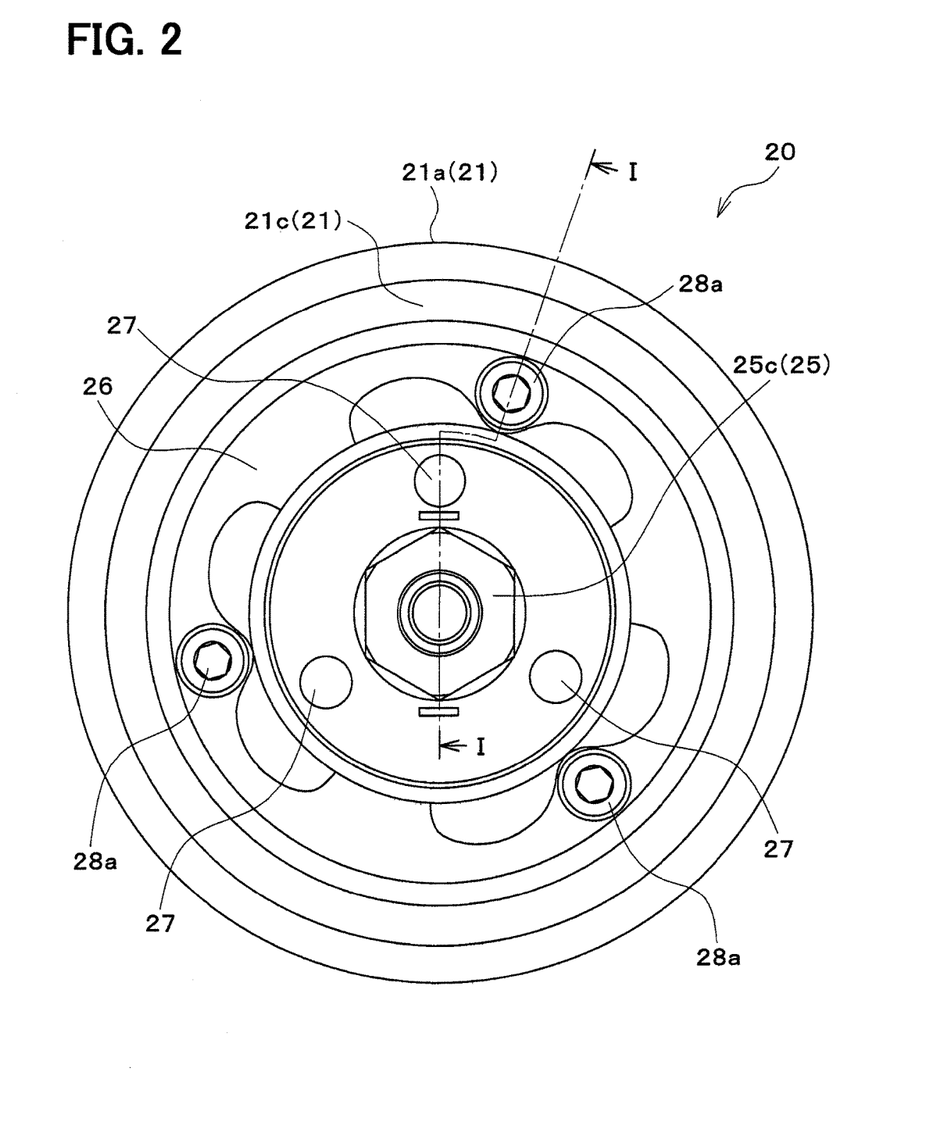
FIG. 2 is a side view illustrating the power transmission device according to the first embodiment.

The power transmission device 20 includes, as illustrated in FIGS. 1 and 2, a pulley 21 used as an example of a driving-side rotor rotated by a rotation driving power that is outputted from the engine, an inner hub 22 that rotates with a rotation shaft 11 of the compressor 10, and a plate 26 linking the pulley 21 with the inner hub 22. FIG. 1 is a partially sectional diagram in an axial direction illustrating the power transmission device 20, and is, specifically, a sectional diagram taken along a line I-I of FIG. 2.

The pulley 21 includes an outer cylinder portion 21a that has a circular cylindrical shape and is arranged coaxially with the rotation shaft 11 of the compressor 10, an inner cylinder portion 21b that has a circular cylindrical shape, is disposed on a radially inner side of the outer cylinder portion 21a and is arranged coaxially with the rotation shaft 11, and an end surface portion 21c that spreads to link edges of the outer cylinder portion 21a and the inner cylinder portion 21b that are opposite from the compressor 10. Therefore, the pulley 21 has an approximately U-shape in cross-section along a radial direction, as shown in FIG. 1.

On an outer circumferential side of the outer cylinder portion 21a, V-shaped grooves (specifically, poly-V-shaped grooves) are provided, to which a V belt transmitting the rotation driving power outputted from the engine is engaged. Fixed to an inner circumferential side of the inner cylinder portion 21b is an outer circumferential side of a ball bearing 23, and fixed to an inner circumferential side of the ball bearing 23 is a boss portion 12 that protrudes toward the power transmission device 20 from a housing providing an outer shell of the compressor 10. Therefore, the pulley 21 is fixed coaxially with the rotation shaft 11 and rotatably with respect to the housing of the compressor 10.

An inner hub 22 includes a disk portion 22a having a circular-shaped through-hole extending through a center part of the disk portion 22a, and a cylinder portion 22b stretching coaxially with the rotation shaft 11. An inner diameter of the cylinder portion 22b is configured to be almost the same in size as an diameter of the through-hole provided in the center part of the disk portion 22a. One of end parts in an axial direction of the cylinder portion 22b of the inner hub 22 that faces toward the compressor 10 is bonded to an annular-shaped washer (seat) 24 by a method such as spot welding or swaging.

A washer 24 is made of iron-based metal, and the rotation shaft 11 of the compressor 10 is inserted into the washer 24 on an inner circumference side of the washer 24. Meanwhile, an end surface of the washer 24 that faces to the compressor 10 in a direction along the rotation shaft 11 contacts a step portion 11a provided on the rotation shaft 11. By the step portion 11a, the inner hub 22 and the washer 24 are prevented from moving toward the compressor 10 in the direction along the rotation shaft 11.

Another of the end parts in an axial direction of the cylinder portion 22b of the inner hub 22 that is opposite from the compressor 10 is bonded to a limiter 25 (power interception member) made of iron-based metal by a method such as spot welding or swaging.

The limiter 25 includes a cylinder portion 25b having a female thread portion 25a screwed to a male thread portion 11b of the rotation shaft 11, and a pressure receiver portion 25c that receives together with the washer 24 a load generated when the cylinder portion 25b is screwed in a rotation direction of the rotation shaft 11. Moreover, a portion connecting the cylinder portion 25b and the pressure receiver portion 25c of the limiter 25 has a breakage portion 25d that is broken when a torque received by the pressure receiver portion 25c becomes higher than or equal to a predetermined standard torque.

The cylinder portion 25b of the limiter 25 is disposed on an inner circumferential side of the cylinder portion 22b of the inner hub 22 and coaxially with the rotation shaft 11 of the compressor 10. Because an outer diameter of the cylinder portion 25b is configured to be smaller than an inner diameter of the cylinder portion 22b of the inner hub 22, an outer peripheral surface of the cylinder portion 25b of the limiter 25 does not contact an inner peripheral surface of the cylinder portion 22b of the inner hub 22.

The pressure receiver portion 25c is a circular plate member that has a through-hole extending through a rotational center part of the pressure receiver portion 25c in the axial direction, and the pressure receiver portion 25c spreads radially outward. An outer circumferential part of a surface of the pressure receiver portion 25c facing to the compressor 10 is joined to an axial end portion of the cylinder portion 22b of the inner hub 22.

The breakage portion 25d is provided as a component having a diameter smaller than an outer diameter of the cylinder portion 25b. That is, an outer diameter of the breakage portion 25d is configured to be smaller than the outer diameter of the cylinder portion 25b and an outer diameter of the pressure receiver portion 25c. In other words, the breakage portion 25d consists of a thin wall part provided in the limiter 25.

A plate 26 is made of metal shaped into an approximately circular plate that spreads in a direction perpendicular to the rotation shaft 11 of the compressor 10, and the plate 26 is an elastic member (flat spring) elastically deformable in the axial direction of the rotation shaft 11 of the compressor 10. More specifically, in the present embodiment, a member made of spring steel (concretely, S60CM) is adopted as the plate 26. On a radially inner side of the plate 26, a hub-side attachment portion 26a to which the inner hub 22 is attached and a pulley-side attachment portion 26b to which the pulley 21 is attached are provided.

Specifically, the hub-side attachment portion 26a includes multiple (three in the present embodiment) through-holes which are positioned to overlap the disk portion 22a of the inner hub 22 in the direction along the rotation shaft 11 of the compressor 10. When viewed in the direction along the rotation shaft 11 of the compressor 10, inner-hub-side through-holes extending through the disk portion 22a of the inner hub 22 are provided at positions corresponding to the hub-side attachment portion 26a of the inner hub 22.

The inner hub 22 and the plate 26 are fixed by a rivet 27 extending through both the through-hole provided as the hub-side attachment portion 26a of the plate 26 and the inner-hub-side through-hole provided in the disk portion 22a of the inner hub 22, in a state where a surface of the disk portion 22a of the inner hub 22 facing to the compressor 10 and a surface of the plate 26 opposite from the compressor 10 contact with each other.

Meanwhile, the pulley-side attachment portion 26b includes multiple (three in the present embodiment) through-holes which are positioned to overlap an end surface portion 21c of the pulley 21 in the direction along the rotation shaft 11 of the compressor 10. When viewed in the direction along the rotation shaft 11 of the compressor 10, pulley-side through-holes extending through the end surface portion 21c of the pulley 21 are provided at positions corresponding to the pulley-side attachment portion 26b of the pulley 21.

The pulley 21 and the plate 26 are fixed by fastening a nut 28b and a bolt 28a that extend through both the through-hole provided as the pulley-side attachment portion 26b of the plate 26 and the pulley-side through-hole provided in the end surface portion 21c of the pulley 21, in a state where a surface of the end surface portion 21c of the pulley 21 opposite from the compressor 10 and a surface of the plate 26 facing to the compressor 10 are opposed to each other.

Moreover, in the present embodiment, a shim 29 having a circular plate shape with a through-hole, through which the above-described bolt 28a extends, is interposed between the surface of the end surface portion 21c of the pulley 21 opposite from the compressor 10 and the surface of the plate 26 facing to the compressor 10.

When the cylinder portion 25b of the limiter 25 is fixed to the rotation shaft 11 of the compressor 10 by screwing, and when the pulley 21 and the plate 26 are fixed, a distance $\delta$ between the pulley-side attachment portion 26b and the hub-side attachment portion 26a in the direction along the rotation shaft 11 of the compressor 10 is adjusted to fall within a predetermined standard range (for example, 0 mm<$\delta$≤1.5 mm) because of a thickness of the shim 29.

In other words, in accordance with the thickness of the shim 29, an amount of an elastic deformation of the plate 26 in the direction along the rotation shaft 11 of the compressor 10 is adjusted. In the present embodiment, by elastically deforming the plate 26 like this, the plate 26 gives a load on the inner hub 22 in a direction away from the rotation shaft 11 of the compressor 10.

Figure 3:
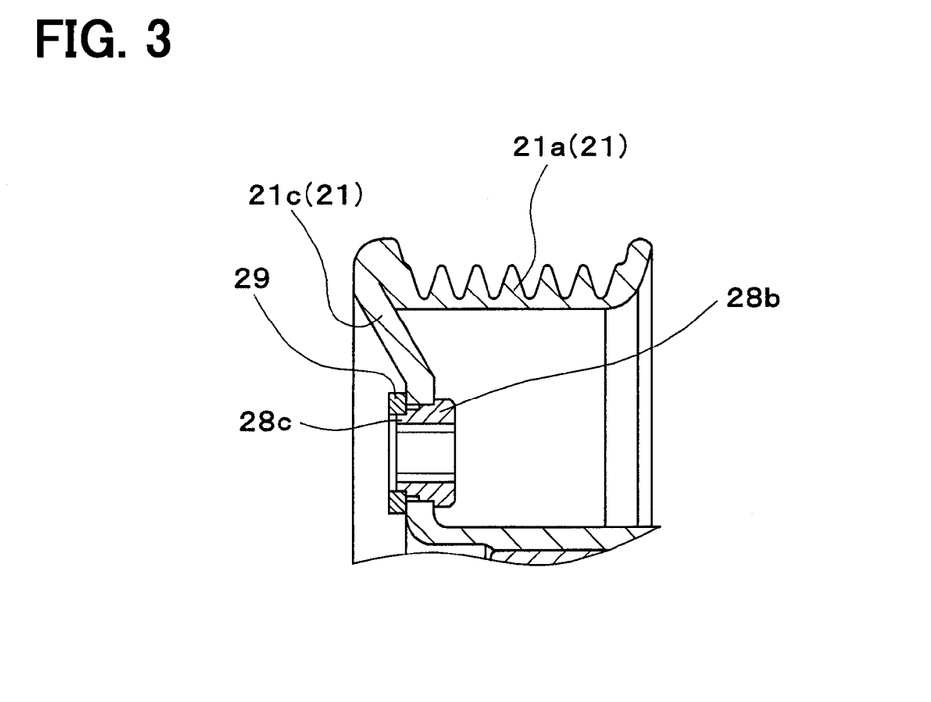
FIG. 3 is a sectional diagram illustrating the power transmission device when a shim is fixed to a pulley according to the first embodiment.
Figure 4:
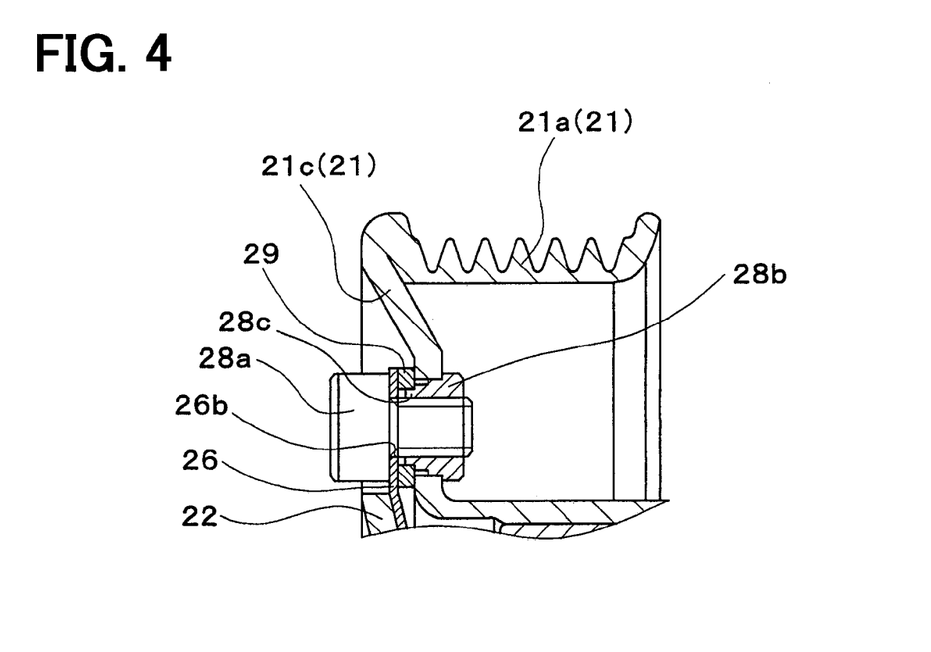
FIG. 4 is a sectional diagram illustrating the power transmission device when a plate is fixed to the pulley according to the first embodiment.

In more detail, the shim 29 is, as shown in FIG. 3, press-fitted to a protruding portion 28c that is provided on a radially inner side of the nut 28b and protruding to a direction away from the compressor 10. The pulley 21 and the plate 26 are fixed, as illustrated in FIG. 4, by fastening the bolt 28a to the nut 28b, in a state where the bolt 28a extends through the pulley-side attachment portion 26b of the plate 26 and the shim 29.

When the pulley 21 and the inner hub 22 is connected by the plate 26 as described above, the inner hub 22, the washer 24 and the limiter 25 are unified and rotated together according to a rotation of the pulley 21. Hence, in the present embodiment, the inner hub 22, the washer 24 and the limiter 25 may be used as an example of a driven-side rotor that rotates with the rotation shaft 11 of the compressor 10.

The plate 26 may be used as an example of a linking elastic member that connects the driven-side rotor and the driving-side rotor. The pulley-side attachment portion 26b of the plate 26 may be used as an example of the driving-side attachment portion that is attached to the driving-side rotor, and the hub-side attachment portion 26a of the plate 26 may be used as an example of the driven-side attachment portion that is attached to the driven-side rotor. The shim 29 may be used as an example of an adjustment member that adjusts the distance $\delta$ in an axial direction between the driving-side attachment portion and the driven-side attachment portion such that the distance $\delta$ falls within the predetermined standard range.

Next, an attachment method when the power transmission device 20 of the present embodiment is attached to the compressor 10 will be described. First, the pulley 21, the nut 28b and the shim 29 are integrated by press-fitting of the shim 29 to the protruding portion 28c that is provided on the radially inner side of the nut 28b (step of preparing of the driving-side rotor). The shim 29 is chosen to be integrated such that the distance δ between the pulley-side attachment portion 26b and the hub-side attachment portion 26a in the axial direction falls within the standard range.

The plate 26 is fixed by the rivet 27 to the driven-side rotor 22, 24, 25 that is provided by fixing the inner hub 22, the washer 24 and the limiter 25 (step of preparing the driven-side rotor).

Subsequently, the pulley 21, with which the nut 28b and the shim 29 is integrated, and the ball baring 23 are attached to the boss portion 12 of the compressor 10 (step of attaching the driving-side rotor). Moreover, the driven-side rotor 22, 24, 25 with which the plate 26 is integrated is attached to the compressor 10 by screwing the female thread portion 25a of the cylinder portion 25b of the limiter 25 of the driven-side rotor 22, 24, 25 to the male thread portion 11b of the rotation shaft 11 of the compressor 10 (step of attaching the driven-side rotor).

Moreover, the pulley 21 that is the driving-side rotor is connected to the driven-side rotor 22, 24, 25 by fastening the above-described nuts 28b and the bolts 28a that are disposed to extend through both the through-holes provided as the pulley-side attachment portion 26b of the plate 26 and the pulley-side through-holes provided in the end surface portion 21c of the pulley 21 (step of connecting the driving-side rotor and the driven-side rotor). Therefore, the power transmission device 20 is attached to the compressor 10.

Next, operations of the above-described configuration according to the present embodiment will be described. As described above, the power transmission device 20 of the present embodiment has a crutch-less configuration. Thus, when an engine is started, a rotation driving power outputted from the engine causes the pulley 21 that is a component of the driving-side rotor, the plate 26 used as an example of the linking elastic member, the inner hub 22 that is a component of the driven-side rotor, washer 24 and the limiter 25 to rotate integrally with each other.

Unless the compressor 10 is locked, the rotation shaft 11 of the compressor 10 connected to the driven-side rotor 22, 24, 25 rotates with the driven-side rotor 22, 24, 25. Hence, the rotation driving power outputted from the engine is transmitted to the compressor 10 and is capable activating the vehicular refrigeration cycle.

In contrast, when the compressor 10 is locked and thereby the rotation shaft 11 cannot be rotated, the female thread portion 25a of the cylinder portion 25b is screwed to the male thread portion 11b of the rotation shaft 11 by a rotation of the limiter 25. Therefore, a load generated by the screwing, i.e. an axial force generated by the screwing is received by the pressure receiver portion 25c of the limiter 25 and the washer 24.

Hence, a tensile stress is given on the breakage portion 25d connecting the pressure receiver portion 25c and the cylinder portion 25b. And, when the load given on the pressure receiver portion 25c becomes higher than or equal to the predetermined value, the breakage portion 25d is fractured and the cylinder portion 25b is taken apart from the pressure receiver portion 25c.

Accordingly, a part of the driven-side rotor 22, 24, 25 connected to the rotation shaft 11 of the compressor 10 is the cylinder portion 25b only, and then the inner hub 22, washer 24 and the pressure receiver portion 25c of the limiter 25 of the driven-side rotor 22, 24, 25 are separated from the rotation shaft 11 of the compressor 10. Consequently, the transmission of the rotation driving power from the engine to the compressor 10 is intercepted. The inner hub 22, the washer 24 and the pressure receiver portion 25c of the limiter 25 may be used as an example of a separation part that is taken apart from the rotation shaft 11 when the breakage portion 25d is broken.

As described above, according to the power transmission device of the present embodiment, the transmission of the rotation driving power can be shut off by a simple configuration in which the breakage portion 25d of the limiter 25 is broken when the compressor 10 is locked.

Moreover, in the present embodiment, the plate 26 that is an example of the linking elastic member gives a load on the inner hub 22 in a direction away from the rotation shaft 11 of the compressor 10 while the breakage portion 25d is not broken. Accordingly, when the breakage portion 25d is broken, a part of the driven-side rotor 22, 24, 25 other than the cylinder portion 25b, i.e. a part separated from the rotation shaft 11 of the compressor 10 can be moved in the direction away from the rotation shaft 11 of the compressor 10.

Therefore, after the breakage portion 25d is fractured, generation of a noise due to contact of the part of the driven-side rotor 22, 24, 25 separated from the rotation shaft 11 of the compressor 10 with the rotation shaft 11 of the compressor 10 can be limited.

Since the power transmission device 20 according to the present embodiment includes the shim 29 that is the adjustment member, the power transmission device 20 is capable of adjusting the distance δ between the pulley-side attachment portion 26b and the hub-side attachment portion 26a in the direction along the rotation shaft 11 of the compressor 10 within the predetermined standard range.

Accordingly, the load on the driven-side rotor 22, 24, 25 caused by an elastic deformation of the plate 26 in the axial direction, while the breakage portion 25d is not broken, can be easily adjusted to an appropriate value. Consequently, it is avoidable to elastically deform the plate 26 unnecessarily and workability of attaching the plate 26 to the pulley 21 can be improved.

In the power transmission device 20 of the present embodiment, since the shim 29 used as the adjustment member is press-fitted to the protruding portion 28c provided on the radially inner side of the nut 28b, and the shim 29 is thereby prevented from falling away when the plate 26 is attached to the pulley 21, the workability of attaching the shim 29 to the plate 26 can be further improved.

Second Embodiment

Figure 5:
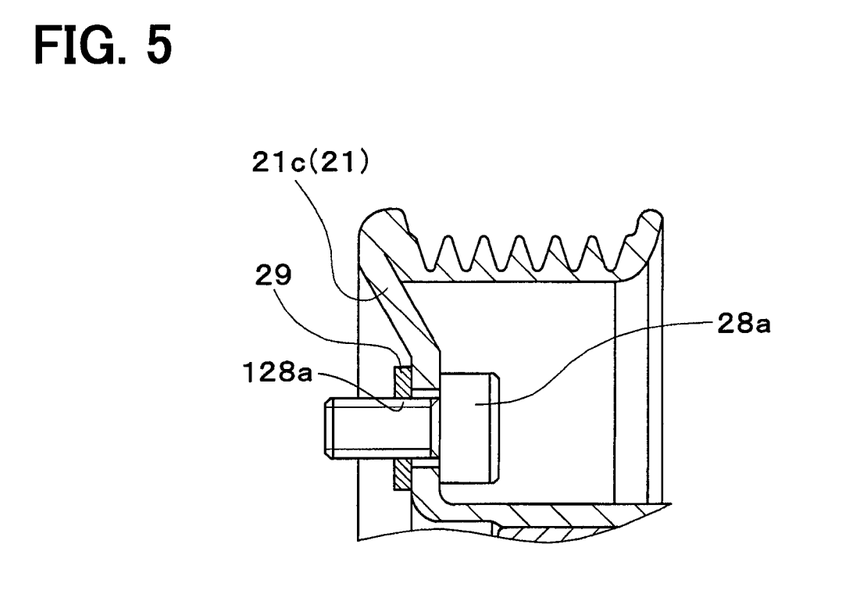
FIG. 5 is a sectional diagram illustrating a power transmission device when a shim is fixed to a pulley according to a second embodiment of the present disclosure.

An example in which the shim 29 is press-fitted to the protruding portion 28c of the nut 28b is described in the first embodiment, but in the present embodiment, an example will be described, in which a shim 29 is press-fitted to a bolt 28a as shown in FIG. 5. Specifically, the bolt 28a of the present embodiment is inserted into a pulley-side through-hole from an end surface portion 21c of a pulley 21 facing to a compressor 10, and the shim 29 is press-fitted to a screw thread portion 128a of the bolt 28a.

Figure 6:
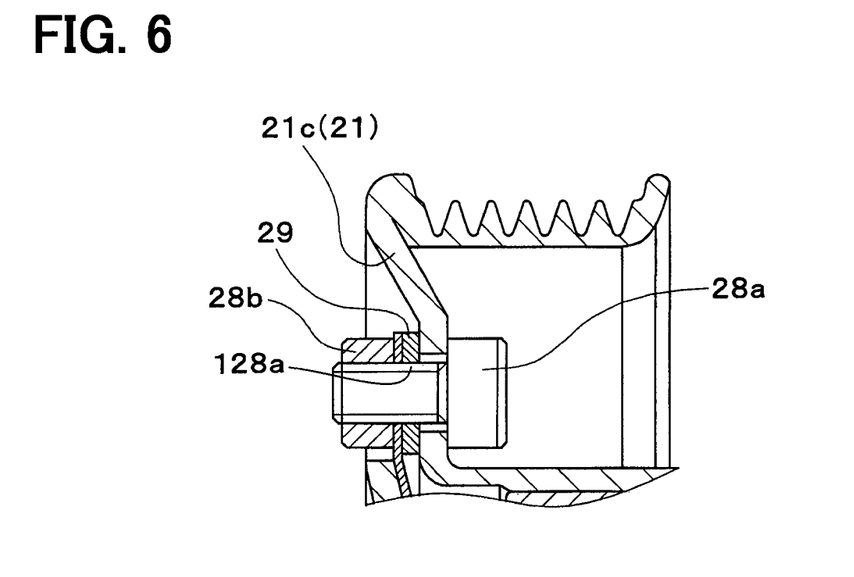
FIG. 6 is a sectional diagram illustrating the power transmission device when a plate is fixed to the pulley according to the second embodiment.

And, the pulley 21 and a plate 26 are fixed, as shown in FIG. 6, by fastening the nut 28b to the bolt 28a that extends through a pulley-side attachment portion 26b of the plate 26.

FIG. 5 is a diagram corresponding to FIG. 3 of the first embodiment, and FIG. 6 is a diagram corresponding to FIG. 4 of the first embodiment. The configuration other than above description is similar to the first embodiment. Therefore, even when the shim 29 is provided according to the present embodiment, the similar effects can be achieved.

Third Embodiment

Figure 7:
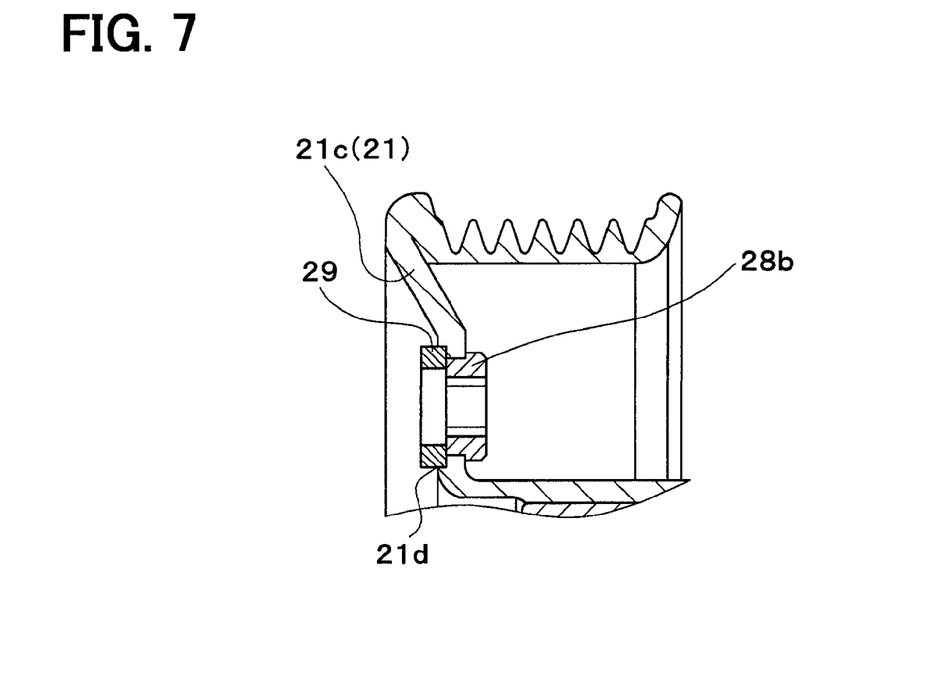
FIG. 7 is a sectional diagram illustrating a power transmission device when a shim is fixed to a pulley according to a third embodiment of the present disclosure.

An example in which the shim 29 is press-fitted to the nut 28b is described in the first embodiment, but in the present embodiment, as shown in FIG. 7, a countersunk hole 21d is provided on an end surface portion 21c of a pulley 21 opposite from a compressor 10 and a radially outer side of a shim 29 is press-fitted to an inner wall of the countersunk hole 21d.

Figure 8:
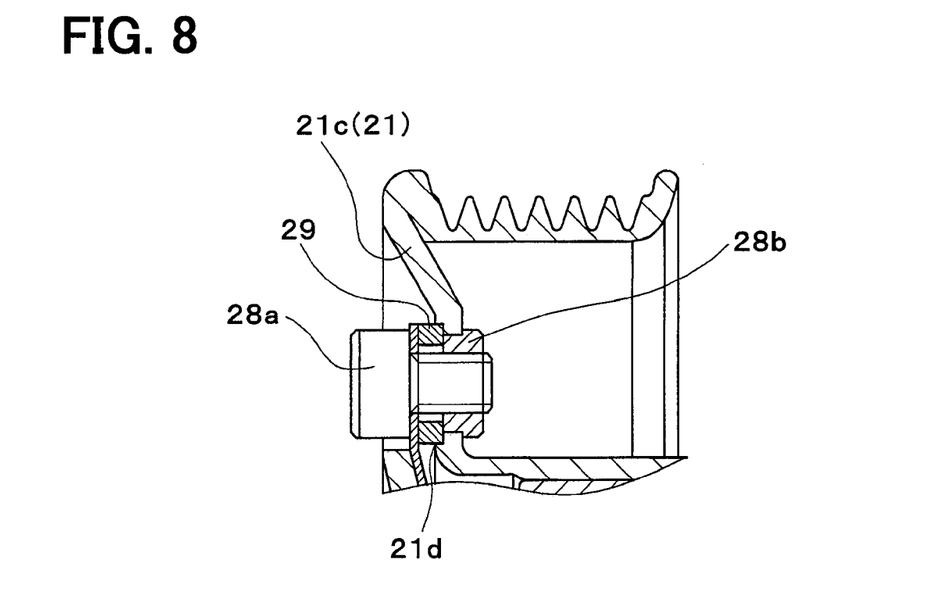
FIG. 8 is a sectional diagram illustrating the power transmission device when a plate is fixed to the pulley according to the third embodiment.

And, the pulley 21 and a plate 26 are fixed, as shown in FIG. 8, by screwing the bolt 28a to a nut 28b in a state where the bolt 28a extends through a pulley-side attachment portion 26b of the plate 26 and the shim 29.

FIG. 7 is a diagram corresponding to FIG. 3 of the first embodiment, and FIG. 8 is a diagram corresponding to FIG. 4 of the first embodiment. The configuration other than above description is similar to the first embodiment. Therefore, even when the shim 29 is provided according to the present embodiment, similar effects may be achieved.

The present disclosure is not limited to the above-described embodiments, and various changes and modifications without departing from the scope of the present disclosure may be adopted as described below.

(1) In the above-described embodiments, the shim 29 is adopted as the adjustment member, but the adjustment member is not limited to the shim 29. The adjustment member may be, for example, a platy member that is interposed between the plate 26 and the end surface portion 21c of the pulley 21 or a platy member that is interposed between the disk portion 22a of the inner hub 22 and the plate 26, as long as the member can adjusts the distance δ between the pulley-side attachment portion 26b and the hub-side attachment portion 26a in the axial direction within the standard range.

(2) In the above-described embodiments, a member made of the pressed spring steel is adopted as the plate 26, but the plate 26 is not limited to this. For example, a component made of stainless alloy (SUS303, SUS304) may be adopted, or a member made of material having higher rigidity than rigidity of general rubber material (EPDM, for example) may be adopted.

(3) In the above-described embodiments, an example is explained, in which the shim 29 is fixed to the pulley 21 by press-fitting, but the shim 29 is not necessarily fixed to the pulley 21. The shim 29 may be fixed to the plate 26 or the inner hub 22. When the shim 29 is fixed to the pulley 21, for example, a method of fixing is not limited to press-fitting and other methods of fixing such as adhesive bonding, welding and soldering are allowed, as long as the distance δ between the pulley-side attachment portion 26b and the hub-side attachment portion 26a in the axial direction can be adjusted to fall within the standard range.

(4) In the above-described embodiments, an example is explained, in which the breakage portion 25d is provided in the limiter 25, but the breakage portion 25d is not limited to this. For example, the inner hub 22 is separated into two components (inner hub and outer hub, for example) in a radial direction, and a bridge portion connecting the two separated components may be used as a breakage portion.

(5) In the above-described embodiments, an example is explained, in which the power transmission device 20 is used for intercepting or allowing the rotation driving power from transmitting or to transmit from the engine to the compressor 10, but the power transmission device 20 of the present disclosure is not limited to this. The power transmission device 20 may be used widely for intercepting or allowing a power transmission between a driving power, such as an engine or an electric motor, and a dynamo driven by a rotation driving power.

The invention claimed is:

1. A power transmission device that transmits a rotation driving power outputted from a driving source to a driving target device, the power transmission device comprising:
    a driving-side rotor rotated by the rotation driving power;
    a driven-side rotor rotated together with a rotation shaft of the driving target device by a torque transmitted from the driving-side rotor; and
    a linking elastic member that has a plate shape spreading in a direction perpendicular to the rotation shaft and is deformed elastically in an axial direction of the rotation shaft, the linking elastic member connecting the driven-side rotor and the driving-side rotor, the torque being transmitted from the driving-side rotor to the driven-side rotor only through a pathway including the linking elastic member, wherein
    the driven-side rotor includes a breakage portion that is broken when the torque transmitted from the driving source to the rotation shaft of the driving target device becomes higher than or equal to a predetermined standard torque, and a separation part separated from the rotation shaft when the breakage portion is broken,
    the linking elastic member connects the separation part and the driving-side rotor, and
    the linking elastic member includes a driving-side attachment portion attached to the driving-side rotor and a driven-side attachment portion attached to the driven-side rotor,
    the power transmission device further comprising an adjustment member that adjusts a distance between the driving-side attachment portion and the driven-side attachment portion in the axial direction of the rotation shaft such that the distance falls within a predetermined standard range.

2. The power transmission device according to claim 1, wherein
    the linking elastic member and the driving-side rotor are connected by a bolt that extends through a through-hole provided in both the linking elastic member and the driving-side rotor and by a nut screwed to the bolt; and
    the adjustment member is a shim interposed between the driving-side rotor and the linking elastic member, the adjustment member having a through-hole through which the bolt extends.

3. The power transmission device according to claim 2, wherein
    the nut includes a protruding portion protruding to an outside of a through-hole of the driving-side rotor, and
    the adjustment member is press-fitted to the protruding portion.

4. The power transmission device according to claim 2, wherein the adjustment member is press-fitted to a screw thread portion of the bolt.

5. The power transmission device according to claim 2, wherein
    the through-hole of the driving-side rotor, through which the bolt extends, has a countersunk hole, and
    a radially outer side of the adjustment member is fitted to an inner wall of the countersunk hole.

6. The power transmission device according to claim 1, wherein the adjustment member is fixed to the driving-side rotor.

7. The power transmission device according to claim 1, wherein the driving-side rotor is always fixed to the linking elastic member.

8. The power transmission device according to claim 1, wherein the linking elastic member gives a load on the separation portion of the driven-side rotor in a direction away from the rotation shaft when the breakage portion is not broken.

* * * * *